June 29, 1926.
T. F. TESSE
1,590,783
AEROPLANE FABRIC AND PROCESS OF COATING THE SAME
Filed Dec. 12, 1922
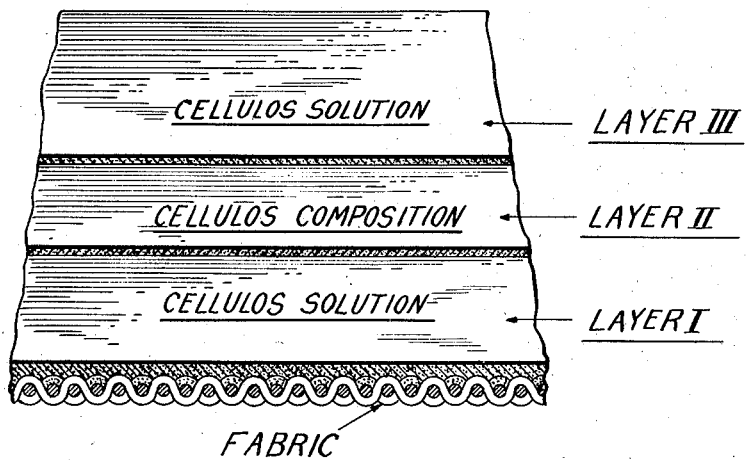
Inventor
Theodore F. Tesse
By his Attorney Patented June 29, 1926.

1,590,783

UNITED STATES PATENT OFFICE.

THEODORE F. TESSE, OF PARIS, FRANCE.

AEROPLANE FABRIC AND PROCESS OF COATING THE SAME.

Application filed December 12, 1922. Serial No. 606,493.

In my copending applications, Serial Nos. 71,201 and 123,640, the latter now being Patent 1,521,055 granted Dec. 30, 1924, I have described a new process of coating aeroplane fabrics consisting essentially in imprisoning between two stretching layers of coating material, an intermediate layer (or a plurality of intermediate layers) of coating material which is very supple and plastic and compounded from (as characteristic ingredients) the following five materials:

1. A dilute solution of cellulose acetate in methyl acetate or acetone forming an impermeabilizing and "stretching" liquid, to which are added as dilutives, alcohol and benzol.

2. A liquid having a higher boiling point than the solvent or dilutives whose function is to prevent precipitation of the cellulose ester during evaporation of the volatile solvent, as, for example, benzyl alcohol or aceto-acetic ether.

3. A substance imparting flexibility suppleness and softness, such as triacetin.

4. A liquid acting as a plasticifying agent to increase the elasticity, and having a boiling point higher than 200° C., for example eugenol.

5. An inert solid substance which apart from giving color or metallization effects, imparts some stretching power and gives strength and rigidity, which substance may be a pigment, or a very finely divided metal, flake, metal, or a plurality of such.

These several layers as referred to, form a homogeneous covering having elasticity and suppleness and at the same time, the necessary rigidity and strength.

The said process produces an improved coating, which, so far as I am aware, is superior to any previously advanced, but it has been found in practice that in many instances, especially in cases where the plane is to be subjected to severe changes in temperature and hygrometric degree, it is better to modify the differences between the compositions of the adjacent layers of the composite coating, or in other words, an advantage is obtained when the outer or rigid layers of the coating are more closely coordinated with the intermediate layer.

I have therefore found it to be advisable to add to the compositions used for forming the two outer layers of the coating, particularly when the coating is to be subjected to a wide range of temperature variation and a wide hygrometric range, a certain amount of high boiling point liquid. The amount used, however, must always be much less than the amount used in the intermediate layer.

In the drawing forming a part of this application, there is shown a section of each layer of the fabric, the material employed being described on the drawing.

In order to illustrate the invention, the relation between the amount of plasticifying or softening agents in the intermediate layer and the amount in the exterior layer may be expressed by the ratio of 6 to 2, although this ratio does not have to be followed exactly, the actual ratio being subject to some degree of variation.

In addition to the use of a softening or plasticifying agent in the exterior layers, it has also been found advisable to use in these layers a certain amount of a liquid such as benzyl alcohol or aceto-acetic ether whose function is to avoid too rapid an evaporation of the volatile solvent, or in other words, to regulate the evaporation of the solvent of low boiling point, thus preventing the precipitation of the cellulose ester in white spots, which would produce brittle or fragile films.

In the practice of my invention, the fabric (linen being preferred) being already attached to the skeleton of the planes, is first coated, as in my prior applications, with an impermeabilizing and "stretching" liquid, which is allowed to dry (i. e. the solvent is allowed to evaporate) thereby forming what I refer to as "layer I".

Then one or more layers of the second composition as above described, is or are applied, and allowed to dry, forming what I refer to as "layer II".

Finally a third coating of composition similar to that used in the first coating layer is applied, and allowed to dry, forming what I refer to as "layer III". In practice I find it usually advantageous to employ the same coating compositions for layers I and III, while layer II is of a different composition.

Without limiting the invention to the details thereof, and merely for the purpose of more fully illustrating the invention, I give the following illustrative example of compositions which may be employed in the manufacture of the three coating layers.

Layers I and III can be formed by applying a composition made of a solution of cellulose acetate containing 8 to 10 parts of cellulose acetate in 60 to 70 parts of methyl acetate or acetone together with 20 parts of approximately equal volumes of alcohol and benzol to which is added about 2 parts of benzyl alcohol and about 1 part of triacetin.

Layer II can be formed by applying one or more coats of a composition made up of a solution of cellulose acetate containing 7 to 8 parts of cellulose acetate in 60 to 65 parts of methyl acetate or acetone together with 22 parts of approximately equal volumes of alcohol and benzol to which is added 2-3 parts eugenol, 2-3 parts of pigment, 1-2 parts of aluminum powder (in the form of small thin flakes), 2-3 parts of benzyl alcohol and 1-2 parts of triacetine.

In both these coating compositions (which are not claimed herein, but which are included in the claims of my Patent 1,521,056 granted Dec. 30, 1924) I may substitute various equivalents, as described in my co-pending application referred to.

The alcohol-benzene mixture is used as a dilutive. The triacetine imparts a certain degree of softness, suppleness and flexibility to the coating. The benzyl alcohol prevents too rapid evaportion of the volatile solvent, and thereby prevents precipitation of the cellulose ester (which would be indicated by the production of "white spots" of a brittle and fragile nature, in the coating).

In the intermediate layer or layers, the eugenol or isoeugenol imparts the necessary degree of plasticity and elasticity to the coating. The inert material serves to overcome any excessive softness of the coating, and the slackness of the cloth which may be produced thereby. In other words, it restores the strength and to a certain extent, the rigidity of the coating. This inert material may also serve as a pigment, to produce the desired color of the plane. The aluminum flake, also serves to a still larger extent to strengthen the coating, to impart the necessary rigidity, and both the inert material and the flake-form metal serve to a large extent, to prevent sunlight from penetrating into the coating, whereby the coating is made more resistant and stable. Both of these materials also decrease the flammability of the coating, and of the fabric or cloth coated.

It will be seen that the present invention is an improvement upon that described in my Patent 1,521,055, an important difference being that the layers I and III contain an agent capable of preventing the precipitation of the cellulose ester, and also contain a relatively small amount of an agent for imparting suppleness and flexibility thereto. The addition of the triacetine in the layers I and III is found to be a distinct advantage also, since there is produced a better bonding or a more perfect union between the successive layers of the coating, this condition being produced by making these successive layers more analogous to each other than in my Patent 1,521,055.

While I have referred especially to cellulose acetate as the base of the three layers of the coating, it is obvious that I may employ cellulose esters of other fatty acids, e. g. formate, propionate, etc. I do not employ the nitrate, since (aside from differences in strength, chemical stability, etc.) the nitrate is entirely too readily inflammable to be used for the purpose.

The flake form of aluminum may be prepared by passing a rather coarse aluminum powder between rolls under heavy pressure. While other metals may be used in place of this, aluminum is to be given the preference. The flake form of the aluminum or other metal strengthens the coating much more than a fine impalpable powder. These flakes overlapping each other to some extent, form a rigid elastic web, cemented together by the cellulose ester composition, which adds materially to the strength of the coating.

The present case is in part a continuation of my Patent 1,521,055 above referred to, and also covers matter included in an abandoned application 221,089 filed Mar. 7, 1918.

What I claim is:

1. A fabric of an aeroplane provided with a coating composed of at least three layers of composition having a fatty acid ester of cellulose as a base; intermediate one of such layers containing an agent capable of imparting plasticity and elasticity, an egent capable of imparting suppleness and flexibility, and an agent capable of preventing the precipitation of cellulose ester, and solid material capable of increasing the strength; the outer layers containing an agent capable of preventing the precipitation of cellulose ester, and containing an amount of agent capable of imparting suppleness and flexibility, less than the amount present in the said intermediate layer.

2. A process which comprises coating fabric parts of an aeroplane, after application to a frame-work, with a succession of at least three closely adherent layers of material having a cellulose ester of a fatty acid as primary ingredient, an intermediate of such layers having ingredients capable of imparting elasticity, plasticity, strength, opacity and rigidity, and a relatively large degree of flexibility and suppleness, the outer of such layers containing ingredients capable of imparting a relatively smaller degree of flexibility and suppleness, and all of such layers containing ingredients capable of preventing the precipitation of the cellulose ester, whereby a stretched coated fabric is produced, having the necessary degree of flexibility rigidity and strength.

3. A fabric forming the covering of a wing of an aeroplane, said fabric being provided with a composite coating comprising a succession of at least three layers of compositions each having a fatty acid ester of cellulose as a base, an intermediate one of which layers has a greater elasticity and flexibility than the other layers, and which contains a solid inert material, and a metal in the form of thin flakes.

4. A fabric forming the covering of an aeroplane, said fabric being provided with a composite coating comprising a succession of at least three layers of compositions each having a fatty acid ester of cellulose as a base, an intermediate one of which layers has a greater elasticity and flexibility than the other layers and which contains a metal in the form of thin flakes.

5. A fabric forming the covering of an aeroplane, said fabric being provided with a composite coating comprising a succession of at least three layers of compositions each having a fatty acid ester of cellulose as a base, an intermediate one of which layers has a greater elasticity and flexibility than the outer layers; and the outer layers containing an agent capable of preventing the precipitation of cellulose ester during the evaporation of the volatile solvent, together with an agent capable of imparting suppleness and flexibility less than the amount present in the said intermediate layer.

6. A tough film coating carried on a base, such coating carrying embedded therein, a multiplicity of small extremely thin metallic flakes overlapping each other, whereby such coating is strengthened and reinforced without losing its flexibility.

In testimony whereof, I have hereunto set my hand this 27th day of October, 1922.

THEODORE F. TESSE.